(12) United States Patent
Papallo et al.

(10) Patent No.: US 7,747,354 B2
(45) Date of Patent: Jun. 29, 2010

(54) CIRCUIT PROTECTION SYSTEM

(75) Inventors: Thomas F. Papallo, Farmington, CT (US); Marcelo E. Valdes, Burlington, CT (US); Gregory P. Lavoie, Bristol, CT (US)

(73) Assignee: General Electric Company, Schenectady, NY (US)

( * ) Notice: Subject to any disclaimer, the term of this patent is extended or adjusted under 35 U.S.C. 154(b) by 640 days.

(21) Appl. No.: 10/662,945

(22) Filed: Sep. 15, 2003

(65) Prior Publication Data

US 2004/0130838 A1 Jul. 8, 2004

Related U.S. Application Data

(60) Provisional application No. 60/438,159, filed on Jan. 6, 2003.

(51) Int. Cl.
*G06F 19/00* (2006.01)
(52) U.S. Cl. .......................... 700/286; 361/63
(58) Field of Classification Search ................ 700/286, 700/287, 292, 293, 294; 323/205, 207, 208, 323/276; 361/62–64, 66–68
See application file for complete search history.

(56) References Cited

U.S. PATENT DOCUMENTS

| | | | | |
|---|---|---|---|---|
| 5,568,399 A | * | 10/1996 | Sumic | 700/293 |
| 6,047,331 A | * | 4/2000 | Medard et al. | 709/239 |
| 6,476,521 B1 | | 11/2002 | Lof et al. | |
| 6,496,342 B1 | * | 12/2002 | Horvath et al. | 361/65 |
| 6,728,205 B1 | * | 4/2004 | Finn et al. | 370/217 |
| 2002/0064166 A1 | * | 5/2002 | Suetsugu et al. | 370/403 |
| 2003/0204768 A1 | * | 10/2003 | Fee | 714/4 |
| 2005/0251296 A1 | * | 11/2005 | Nelson et al. | 700/292 |

OTHER PUBLICATIONS

The International Search Report dated Oct. 8, 2004 from the corresponding PCT Application No. PCT/USO4/00077.

* cited by examiner

*Primary Examiner*—Kidest Bahta
(74) *Attorney, Agent, or Firm*—Ohlandt, Greeley, Ruggiero & Perle, L.L.P.

(57) ABSTRACT

A circuit protection system is provided that provides dynamic zones of protection for the circuit. The zones of protection can be based in part upon the topology of the circuit. The protection system can perform various dynamic zone protective functions for the zones of protection.

17 Claims, 11 Drawing Sheets

CIRCUIT PROTECTION SYSTEM

CROSS REFERENCE TO RELATED APPLICATIONS

This application claims benefit of U.S. Provisional Application Ser. No. 60/438,159 filed on Jan. 6, 2003, the content of which is incorporated by reference herein.

BACKGROUND OF THE INVENTION

1. Field of the Invention

This disclosure relates generally to power distribution systems and more particularly, to a method and apparatus for a circuit protection system providing dynamic zone protection throughout the system.

2. Description of the Prior Art

In power distribution systems, power is distributed to various loads and is typically divided into branch circuits, which supply power to specified loads. The branch circuits also can be connected to other power distribution equipment.

Due to the concern of an abnormal power condition in the system, i.e., a fault, it is known to provide circuit protective devices or power switching devices, e.g., circuit breakers, to protect the circuit. The circuit breakers seek to prevent or minimize damage and typically function automatically. The circuit breakers also seek to minimize the extent and duration of electrical service interruption in the event of a fault.

It is further known to open and close these circuit breakers based upon statically defined zones of protection within the configuration of the power distribution system. The contemporary protection system applies algorithms based upon electrical properties of these statically defined zones and clears the fault through the use of circuit breakers disposed within the statically defined zones of protection.

Such a contemporary system fails to account for changes to the state, topology or configuration of the power distribution system, such as power flow changes resulting from the opening or closing of circuit breakers. The failure of the protection system to adapt to the dynamics of the state of the power distribution system results in the application of incorrect algorithms and unwanted functions of power control devices based upon the erroneous, static state within the zone of protection. This increases the risk of damage to the system, such as failure to timely clear a fault. This also decreases the efficiency of the system, such as through untimely opening of circuit breakers and nuisance tripping, and can increase the extent and duration of electrical service interruption in the event of a fault.

Accordingly, there is a need for circuit protection systems incorporated into power distribution systems that decrease the risk of damage and increase efficiency of the power distribution system. There is a further need for protection systems that can vary the zones of protection and account for the changing state within the zones as the power distribution system changes. There is also a need for protection systems that provide optimized protection without sacrificing selectivity.

SUMMARY OF THE INVENTION

In one aspect, a method of protecting a circuit is provided. The method comprises monitoring a zone of protection of the circuit to determine a first topology, adjusting a zone protective function for the zone of protection based at least in part upon changes to the first topology, and performing the zone protective function on the zone of protection.

In another aspect, a method of protecting a circuit is provided which comprises monitoring the circuit to determine a first topology and defining a zone of protection for at least a portion of the circuit based at least in part upon changes to the first topology.

In yet another aspect, a protection system coupled to a circuit having a circuit breaker is provided. The system comprises a control processing unit communicatively coupled to the circuit. The control processing unit monitors a topology of the circuit. The control processing unit defines a zone of protection for at least a portion of the circuit based at least in part upon the topology. The control processing unit redefines the zone of protection based at least in part upon changes to the topology.

In a further aspect, a protection system is provided that is coupled to a circuit having a zone of protection and a circuit breaker. The protection system comprises a control processing unit communicatively coupled to the circuit. The control processing unit monitors a topology of the zone of protection. The control processing unit adjusts a zone protective function for the zone of protection based at least in part upon the topology. The control processing unit performs the zone protective function to detect a fault in the zone of protection.

In yet a further aspect, a power distribution system is provided which comprises a circuit and a control processing unit. The circuit has a circuit breaker, a power source and a load. The control processing unit is communicatively coupled to the circuit. The control processing unit determines a topology of the circuit. The control processing unit defines a zone of protection for at least a portion of the circuit based at least in part upon the topology. The control processing unit redefines the zone of protection based at least in part upon changes to the topology.

In yet another further aspect, a power distribution system is provided which comprises a circuit and a control processing unit. The circuit has a zone of protection, a circuit breaker, a power source and a load. The control processing unit is communicatively coupled to the circuit. The control processing unit monitors a topology of the zone of protection. The control processing unit adjusts a zone protective function for the zone of protection based at least in part upon the topology. The control processing unit performs the zone protective function to detect a fault in the zone of protection.

The above-described and other features and advantages of the present disclosure will be appreciated and understood by those skilled in the art from the following detailed description, drawings, and appended claims.

DETAILED DESCRIPTION OF THE INVENTION

Figure 1:
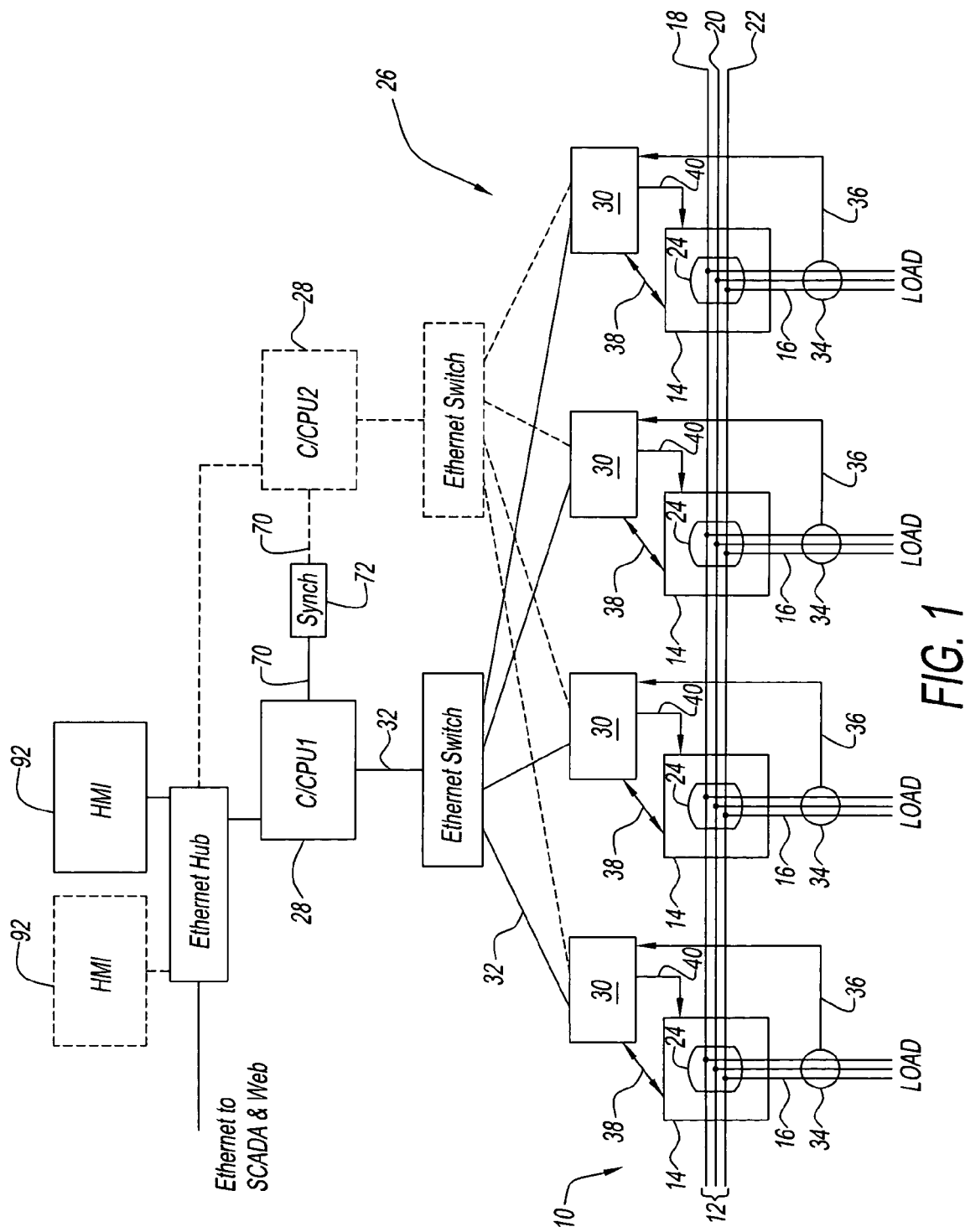
FIG. 1 is a schematic illustration of a power distribution system.

Referring now to the drawings and in particular to FIG. 1, an exemplary embodiment of a power distribution system generally referred to by reference numeral 10 is illustrated. System 10 distributes power from at least one power bus 12 through a number or plurality of power switching devices or circuit breakers 14 to branch circuits 16.

Power bus 12 is illustrated by way of example as a three-phase power system having a first phase 18, a second phase 20, and a third phase 22. Power bus 12 can also include a neutral phase (not shown). System 10 is illustrated for purposes of clarity distributing power from power bus 12 to four circuits 16 by four breakers 14. Of course, it is contemplated by the present disclosure for power bus 12 to have any desired number of phases and/or for system 10 to have any desired number of circuit breakers 14 and any topology of circuit breakers, e.g., in series, or in parallel, or other combinations.

Each circuit breaker 14 has a set of separable contacts 24 (illustrated schematically). Contacts 24 selectively place power bus 12 in communication with at least one load (also illustrated schematically) on circuit 16. The load can include devices, such as, but not limited to, motors, welding machinery, computers, heaters, lighting, and/or other electrical equipment.

Power distribution system 10 is illustrated in FIG. 1 with an exemplary embodiment of a centrally controlled and fully integrated protection, monitoring, and control system 26 (hereinafter "system"). System 26 is configured to control and monitor power distribution system 10 from a central control processing unit 28 (hereinafter "CCPU"). CCPU 28 communicates with a number or plurality of data sample and transmission modules 30 (hereinafter "module") over a data network 32. Network 32 communicates all of the information from all of the modules 30 substantially simultaneously to CCPU 28.

Thus, system 26 can include protection and control schemes that consider the value of electrical signals, such as current magnitude and phase, at one or all circuit breakers 14. Further, system 26 integrates the protection, control, and monitoring functions of the individual breakers 14 of power distribution system 10 in a single, centralized control processor (e.g., CCPU 28). System 26 provides CCPU 28 with all of a synchronized set of information available through digital communication with modules 30 and circuit breakers 14 on network 32 and provides the CCPU with the ability to operate these devices based on this complete set of data.

Specifically, CCPU 28 performs the primary power distribution functions for power distribution system 10. Namely, CCPU 28 may perform some or all of instantaneous overcurrent protection (IOC), short time overcurrent, longtime overcurrent, relay protection, and logic control as well as digital signal processing functions of system 26. Thus, system 26 enables settings to be changed and data to be logged in a single, central location, i.e., CCPU 28. CCPU 28 is described herein by way of example as a central processing unit. Of course, it is contemplated by the present disclosure for CCPU 28 to include any programmable circuit, such as, but not limited to, computers, processors, microcontrollers, microcomputers, programmable logic controllers, application specific integrated circuits, and other programmable circuits.

As shown in FIG. 1, each module 30 is in communication with one of the circuit breakers 14. Each module 30 is also in communication with at least one sensor 34 sensing a condition or electrical parameter of the power in each phase (e.g., first phase 18, second phase 20, third phase 22, and neutral) of bus 12 and/or circuit 16. Sensors 34 can include current transformers (CTs), potential transformers (PTs), and any combination thereof. Sensors 34 monitor a condition or electrical parameter of the incoming power in circuits 16 and provide a first or parameter signal 36 representative of the condition of the power to module 30. For example, sensors 34 can be current transformers that generate a secondary current proportional to the current in circuit 16 so that first signals 36 are the secondary current.

Module 30 sends and receives one or more second signals 38 to and/or from circuit breaker 14. Second signals 38 can be representative of one or more conditions of breaker 14, such as, but not limited to, a position or state of separable contacts 24, a spring charge switch status, a lockout state or condition, and others. In addition, module 30 is configured to operate or actuate circuit breaker 14 by sending one or more third signals 40 to the breaker to open/close separable contacts 24 as desired, such as open/close commands or signals. In a first embodiment, circuit breakers 14 cannot open separable contacts 24 unless instructed to do so by system 26.

System 26 utilizes data network 32 for data acquisition from modules 30 and data communication to the modules. Accordingly, network 32 is configured to provide a desired level of communication capacity and traffic management between CCPU 28 and modules 30. In an exemplary embodiment, network 32 can be configured to not enable communication between modules 30 (i.e., no module-to-module communication).

In addition, system 26 can be configured to provide a consistent fault response time. As used herein, the fault response time of system 26 is defined as the time between when a fault condition occurs and the time module 30 issues an trip command to its associated breaker 14. In an exemplary embodiment, system 26 has a fault response time that is less than a single cycle of the 60 Hz (hertz) waveform. For example, system 26 can have a maximum fault response time of about three milliseconds.

The configuration and operational protocols of network 32 are configured to provide the aforementioned communication capacity and response time. For example, network 32 can be an Ethernet network having a star topology as illustrated in FIG. 1. In this embodiment, network 32 is a full duplex network having the collision-detection multiple-access (CSMA/CD) protocols typically employed by Ethernet networks removed and/or disabled. Rather, network 32 is a switched Ethernet for preventing collisions.

In this configuration, network 32 provides a data transfer rate of at least about 100 Mbps (megabits per second). For example, the data transfer rate can be about 1 Gbps (gigabits per second). Additionally, communication between CCPU 28 and modules 30 across network 32 can be managed to optimize the use of network 32. For example, network 32 can be optimized by adjusting one or more of a message size, a message frequency, a message content, and/or a network speed.

Accordingly, network 32 provides for a response time that includes scheduled communications, a fixed message length, full-duplex operating mode, and a switch to prevent collisions so that all messages are moved to memory in CCPU 28 before the next set of messages is scheduled to arrive. Thus, system 26 can perform the desired control, monitoring, and protection functions in a central location and manner.

It should be recognized that data network 32 is described above by way of example only as an Ethernet network having a particular configuration, topography, and data transmission protocols. Of course, the present disclosure contemplates the use of any data transmission network that ensures the desired data capacity and consistent fault response time necessary to perform the desired range of functionality. The exemplary embodiment achieves sub-cycle transmission times between CCPU 28 and modules 30 and full sample data to perform all power distribution functions for multiple modules with the accuracy and speed associated with traditional devices.

CCPU 28 can perform branch circuit protection, zone protection, and relay protection interdependently because all of the system information is in one central location, namely at the CCPU. In addition, CCPU 28 can perform one or more monitoring functions on the centrally located system information. Accordingly, system 26 provides a coherent and integrated protection, control, and monitoring methodology not considered by prior systems. For example, system 26 integrates and coordinates load management, feed management, system monitoring, and other system protection functions in a low cost and easy to install system.

Figure 2:
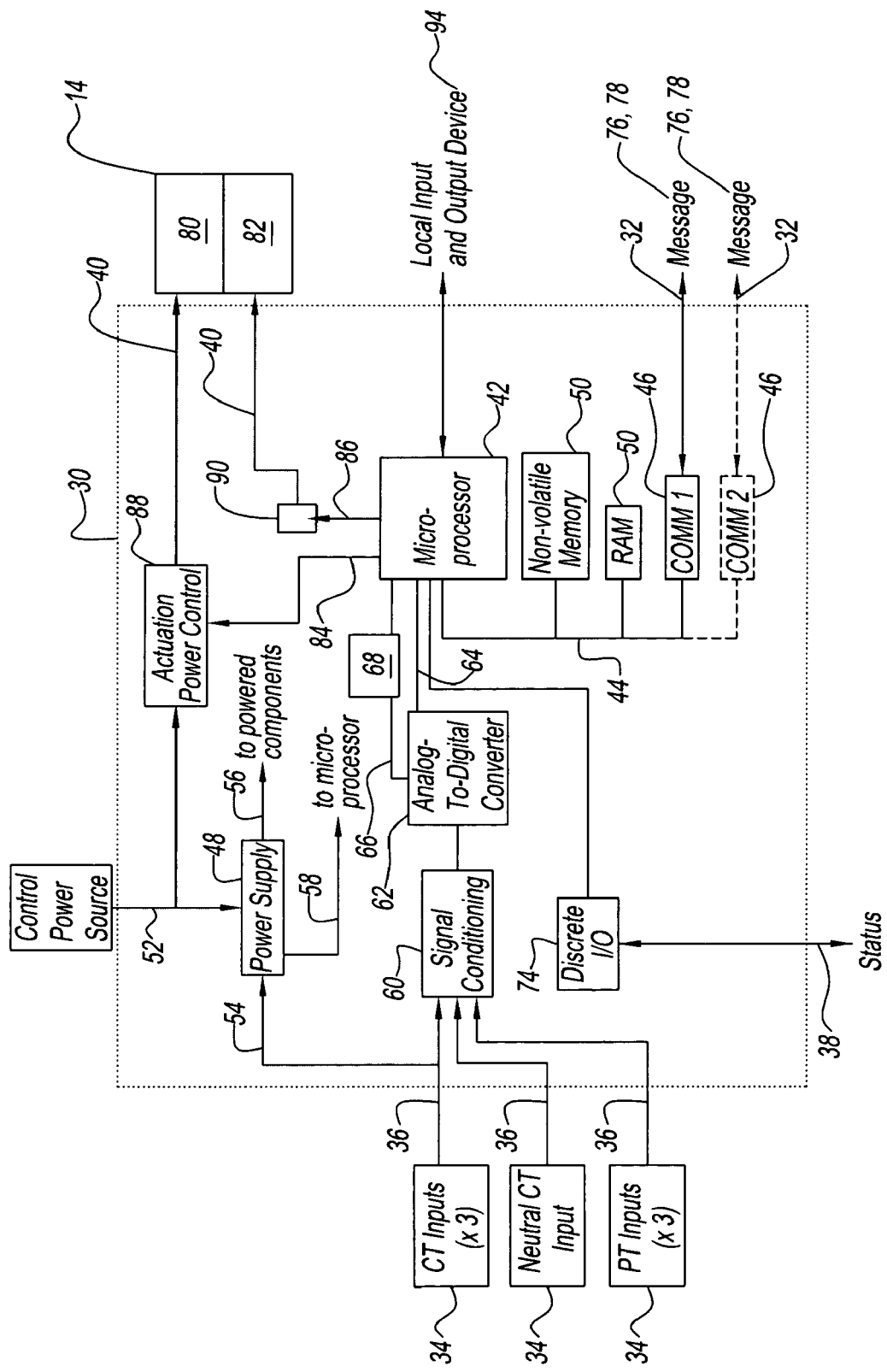
FIG. 2 is a schematic illustration of a module of the power distribution system of FIG. 1.

An exemplary embodiment of module 30 is illustrated in FIG. 2. Module 30 has a microprocessor 42, a data bus 44, a network interface 46, a power supply 48, and one or more memory devices 50.

Power supply 48 is configured to receive power from a first source 52 and/or a second source 54. First source 52 can be one or more of an uninterruptible power supply (not shown), a plurality of batteries (not shown), a power bus (not shown), and other sources. In the illustrated embodiment, second source 54 is the secondary current available from sensors 34.

Power supply 48 is configured to provide power 56 to module 30 from first and second sources 52, 54. For example, power supply 48 can provide power 56 to microprocessor 42, data bus 42, network interface 44, and memory devices 50. Power supply 48 is also configured to provide a fourth signal 58 to microprocessor 42. Fourth signal 58 is indicative of what sources are supplying power to power supply 48. For example, fourth signal 58 can indicate whether power supply 48 is receiving power from first source 52, second source 54, or both of the first and second sources.

Network interface 46 and memory devices 50 communicate with microprocessor 42 over data bus 44. Network interface 46 can be connected to network 32 so that microprocessor 42 is in communication with CCPU 28.

Microprocessor 42 receives digital representations of first signals 36 and second signals 38. First signals 36 are continuous analog data collected by sensors 34, while second signals 38 are discrete analog data from breaker 14. Thus, the data sent from modules 30 to CCPU 28 is a digital representation of the actual voltages, currents, and device status. For example, first signals 36 can be analog signals indicative of the current and/or voltage in circuit 16.

Accordingly, system 26 provides the actual raw parametric or discrete electrical data (i.e., first signals 36) and device physical status (i.e., second signal 38) to CCPU 28 via network 32, rather than processed summary information sampled, created, and stored by devices such as trip units, meters, or relays. As a result, CCPU 28 has complete, raw system-wide data with which to make decisions and can therefore operate any or all breakers 14 on network 32 based on information derived from as many modules 30 as the control and protection algorithms resident in CCPU 28 require.

Module 30 has a signal conditioner 60 and an analog-digital converter 62. First signals 36 are conditioned by signal conditioner 60 and converted to digital signals 64 by A/D converter 62. Thus, module 30 collects first signals 36 and presents digital signals 64, representative of the raw data in the first signals, to microprocessor 42. For example, signal conditioner 60 can include a filtering circuit (not shown) to improve a signal-to-noise ratio for first signal 36, a gain circuit (not shown) to amplify the first signal, a level adjustment circuit (not shown) to shift the first signal to a predetermined range, an impedance match circuit (not shown) to facilitate transfer of the first signal to A/D converter 62, and any combination thereof. Further, A/D converter 62 can be a sample-and-hold converter with external conversion start signal 66 from microprocessor 42 or a clock circuit 68 controlled by microprocessor 42 to facilitate synchronization of digital signals 64.

It is desired for digital signals 64 from all of the modules 30 in system 26 to be collected at substantially the same time. Specifically, it is desired for digital signals 64 from all of the modules 30 in system 26 to be representative of substantially the same time instance of the power in power distribution system 10.

Modules 30 sample digital signals 64 based, at least in part, upon a synchronization signal or instruction 70 as illustrated in FIG. 1. Synchronization instruction 70 can be generated from a synchronizing clock 72 that is internal or external to CCPU 28. Synchronization instruction 70 is simultaneously communicated from CCPU 28 to modules 30 over network 32. Synchronizing clock 72 sends synchronization instructions 70 at regular intervals to CCPU 28, which forwards the instructions to all modules 30 on network 32.

Modules 30 use synchronization instruction 70 to modify a resident sampling protocol. For example, each module 30 can have a synchronization algorithm resident on microprocessor 42. The synchronization algorithm resident on microprocessor 42 can be a software phase-lock-loop algorithm. The software phase-lock-loop algorithm adjusts the sample period of module 30 based, in part, on synchronization instructions 70 from CCPU 28. Thus, CCPU 28 and modules 30 work together in system 26 to ensure that the sampling (i.e., digital signals 64) from all of the modules in the system is synchronized.

Accordingly, system 26 is configured to collect digital signals 64 from modules 30 based in part on synchronization instruction 70 so that the digital signals are representative of the same time instance, such as being within a predetermined time-window from one another. Thus, CCPU 28 can have a set of accurate data representative of the state of each monitored location (e.g., modules 30) within the power distribution system 10. The predetermined time-window can be less than about ten microseconds. For example, the predetermined time-window can be about five microseconds.

The predetermined time-window of system 26 can be affected by the port-to port variability of network 32. In an exemplary embodiment, network 32 has a port-to-port variability of in a range of about 24 nanoseconds to about 720 nanoseconds. In an alternate exemplary embodiment, network 32 has a maximum port-to-port variability of about 2 microseconds.

It has been determined that control of all of modules 30 to this predetermined time-window by system 26 enables a desired level of accuracy in the metering and vector functions across the modules, system waveform capture with coordinated data, accurate event logs, and other features. In an exemplary embodiment, the desired level of accuracy is equal to the accuracy and speed of traditional devices. For example, the predetermined time-window of about ten microseconds provides an accuracy of about 99% in metering and vector functions.

Second signals 38 from each circuit breaker 14 to each module 30 are indicative of one or more conditions of the circuit breaker. Second signals 38 are provided to a discrete I/O circuit 74 of module 30. Circuit 74 is in communication with circuit breaker 14 and microprocessor 42. Circuit 74 is configured to ensure that second signals 38 from circuit breaker 14 are provided to microprocessor 42 at a desired voltage and without jitter. For example, circuit 74 can include de-bounce circuitry and a plurality of comparators.

Microprocessor 42 samples first and second signals 36, 38 as synchronized by CCPU 28. Then, converter 62 converts the first and second signals 36, 38 to digital signals 64, which is packaged into a first message 76 having a desired configuration by microprocessor 42. First message 76 can include an indicator that indicates which synchronization signal 70 the first message was in response to. Thus, the indicator of which synchronization signal 70 first message 76 is responding to is returned to CCPU 28 for sample time identification.

CCPU 28 receives first message 76 from each of the modules 30 over network 32 and executes one or more protection and/or monitoring algorithms on the data sent in all of the first messages. Based on first message 76 from one or more modules 30, CCPU 28 can control the operation of one or more circuit breakers 14. For example, when CCPU 28 detects a fault from one or more of first messages 76, the CCPU sends a second message 78 to one or more modules 30 via network 32, such as open or close commands or signals, or circuit breaker actuation or de-actuation commands or signals.

In response to second message 78, microprocessor 42 causes third signal 40 to operate or actuate (e.g., open contacts 24) circuit breaker 14. Circuit breaker 14 can include more than one operation or actuation mechanism. For example, circuit breaker 14 can have a shunt trip 80 and a magnetically held solenoid 82. Microprocessor 42 is configured to send a first output 84 to operate shunt trip 80 and/or a second output 86 to operate solenoid 82. First output 84 instructs a power control module 88 to provide third signal 40 (i.e., power) to shunt trip 80, which can separate contacts 24. Second output 86 instructs a gating circuit 90 to provide third signal 40 to solenoid 82 (i.e., flux shifter) to separate contacts 24. It should be noted that shunt trip 80 requires first source 52 to be present, while solenoid 82 can be operated when only second source 54 is present. In this manner, microprocessor 42 can operate circuit breaker 14 in response to a specified condition, such as, for example, a detected overcurrent, regardless of the state of first and second sources 52, 54. Additionally, a lockout device can be provided that is operably connected to circuit breaker 14.

In addition to operating circuit breaker 14, module 30 can communicate to one or more local input and/or output devices 94. For example, local output device 94 can be a module status indicator, such as a visual or audible indicator. In one embodiment, device 94 is a light emitting diode (LED) configured to communicate a status of module 30. In another embodiment, local input device 94 can be a status-modifying button for manually operating one or more portions of module 30. In yet another embodiment, local input device 94 is a module interface for locally communicating with module 30.

Accordingly, modules 30 are adapted to sample first signals 36 from sensors 34 as synchronized by the CCPU. Modules 30 then package the digital representations (i.e., digital signals 64) of first and second signals 36, 38, as well as other information, as required into first message 76. First message 76 from all modules 30 are sent to CCPU 28 via network 32. CCPU 28 processes first message 76 and generates and stores instructions to control the operation of each circuit breaker 14 in second message 78. CCPU 28 sends second message 78 to all of the modules 30. In an exemplary embodiment, CCPU 28 sends second message 78 to all of the modules 30 in response to synchronization instruction 70.

Accordingly, system 26 can control each circuit breaker 14 based on the information from that breaker alone, or in combination with the information from one or more of the other breakers in the system 26. Under normal operating conditions, system 26 performs all monitoring, protection, and control decisions at CCPU 28.

Since the protection and monitoring algorithms of system 26 are resident in CCPU 28, these algorithms can be enabled without requiring hardware or software changes in circuit breaker 14 or module 30. For example, system 26 can include a data entry device 92, such as a human-machine-interface (HMI), in communication with CCPU 28. In this embodiment, one or more attributes and functions of the protection and monitoring algorithms resident on CCPU 28 can easily be modified from data entry device 92. Thus, circuit breaker 14 and module 30 can be more standardized than was possible with the circuit breakers/trip units of prior systems. For example, over one hundred separate circuit breakers/trip units have been needed to provide a full range of sizes normally required for protection of a power distribution system. However, the generic nature of circuit breaker 14 and module 30 enabled by system 26 can reduce this number by over sixty percent. Thus, system 26 can resolve the inventory issues, retrofittability issues, design delay issues, installation delay issues, and cost issues of prior power distribution systems.

It should be recognized that system 26 is described above as having one CCPU 28 communication with modules 30 by way of a single network 32. However, it is contemplated by the present disclosure for system 26 to have redundant CCPUs 26 and networks 32 as illustrated in phantom in FIG. 1. For example, module 30 is illustrated in FIG. 2 having two network interfaces 46. Each interface 46 is configured to operatively connect module 30 to a separate CCPU 28 via a separate data network 32. In this manner, system 26 would remain operative even in case of a failure in one of the redundant systems.

Modules 30 can further include one or more backup systems for controlling breakers 14 independent of CCPU 28. For example, system 26 may be unable to protect circuit 16 in case of a power outage in first source 52, during the initial startup of CCPU 28, in case of a failure of network 32, and other reasons. Under these failure conditions, each module 30 includes one or more backup systems to ensure that at least some protection is provided to circuit breaker 14. The backup system can include one or more of an analog circuit driven by second source 54, a separate microprocessor driven by second source 54, and others.

Figure 3:
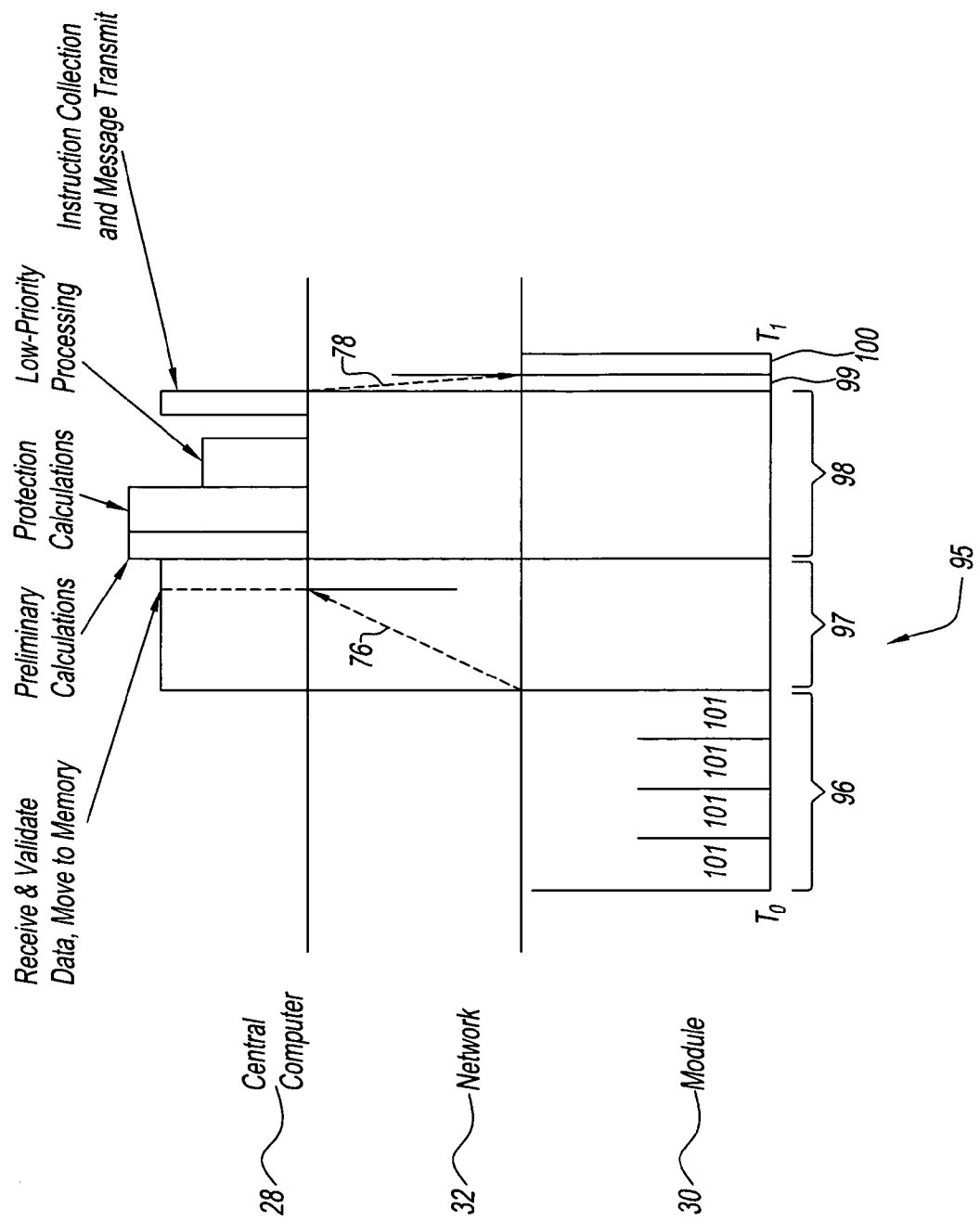
FIG. 3 is a response time for the protection system of FIG. 1.

Referring now to FIG. 3, an exemplary embodiment of a response time 95 for system 26 is illustrated with the system operating stably (e.g., not functioning in a start-up mode). Response time 95 is shown starting at T0 and ending at T1. Response time 95 is the sum of a sample time 96, a receive/ validate time 97, a process time 98, a transmit time 99, and a decode/execute time 100.

In this example, system 26 includes twenty-four modules 30 each connected to a different circuit breaker 14. Each module 30 is scheduled by the phase-lock-loop algorithm and synchronization instruction 70 to sample its first signals 36 at a prescribed rate of 128 samples per cycle. Sample time 96 includes four sample intervals 101 of about 0.13 milliseconds (ms) each. Thus, sample time 96 is about 0.27 ms for data sampling and packaging into first message 76.

Receive/validate time 97 is preferably initiated at a fixed time delay after the receipt of synchronization instruction 70. In an exemplary embodiment, receive/validate time 97 is a fixed time that is, for example, the time required to receive all first messages 76 as determined from the latency of data network 32. For example, receive/validate time 97 can be about 0.25 ms where each first message 76 has a size of about 1000 bits, system 26 includes twenty-four modules 30 (i.e., 24,000 bits), and network 32 is operating at about 100 Mbps. Accordingly, CCPU 28 manages the communications and moving of first messages 76 to the CCPU during receive/validate time 97.

The protection processes (i.e., process time 98) starts at the end of the fixed receive/validate time 97 regardless of the receipt of first messages 76. If any modules 30 are not sending first messages 76, CCPU 28 flags this error and performs all functions that have valid data. Since system 26 is responsible for protection and control of multiple modules 30, CCPU 28 is configured to not stop the entire system due to the loss of data (i.e., first message 76) from a single module 30. In an exemplary embodiment, process time 98 is about 0.52 ms.

CCPU 28 generates second message 78 during process time 98. Second message 78 can be twenty-four second messages (i.e., one per module 30) each having a size of about 64 bits per module. Alternately, it is contemplated by the present disclosure for second message 78 to be a single, multi-cast or broadcast message. In this embodiment, second message 78 includes instructions for each module 30 and has a size of about 1600 bits.

Transmit time 99 is the time necessary to transmit second message 78 across network 32. In the example where network 32 is operating at about 100 Mbps and second message 78 is about 1600 bits, transmit time 99 is about 0.016 ms.

It is also contemplated for second message 78 to include a portion of synchronization instruction 70. For example, CCPU 28 can be configured to send second message 78 upon receipt of the next synchronization instruction 70 from clock 72. In this example, the interval between consecutive second messages 76 can be measured by module 30 and the synchronization information in the second message, if any, can be used by the synchronization algorithm resident on microprocessor 42.

Once modules 30 receive second message 78, each module decodes the message and executes its instructions (i.e., send third signals 40), if any, in decode/execute time 100. For example, decode/execute time 100 can be about 0.05 ms.

In this example, response time 95 is about 1.11 ms. Of course, it should be recognized that system response time 95 can be accelerated or decelerated based upon the needs of system 26. For example, system response time 95 can be adjusted by changing one or more of the sample period, the number of samples per transmission, the number of modules 30, the message size, the message frequency, the message content, and/or the network speed.

It is contemplated by the present disclosure for system 26 to have response time 95 of up to about 3 milliseconds. Thus, system 26 is configured to open any of its circuit breakers within about 3 milliseconds from the time sensors 34 sense conditions outside of the set parameters.

Figure 4:
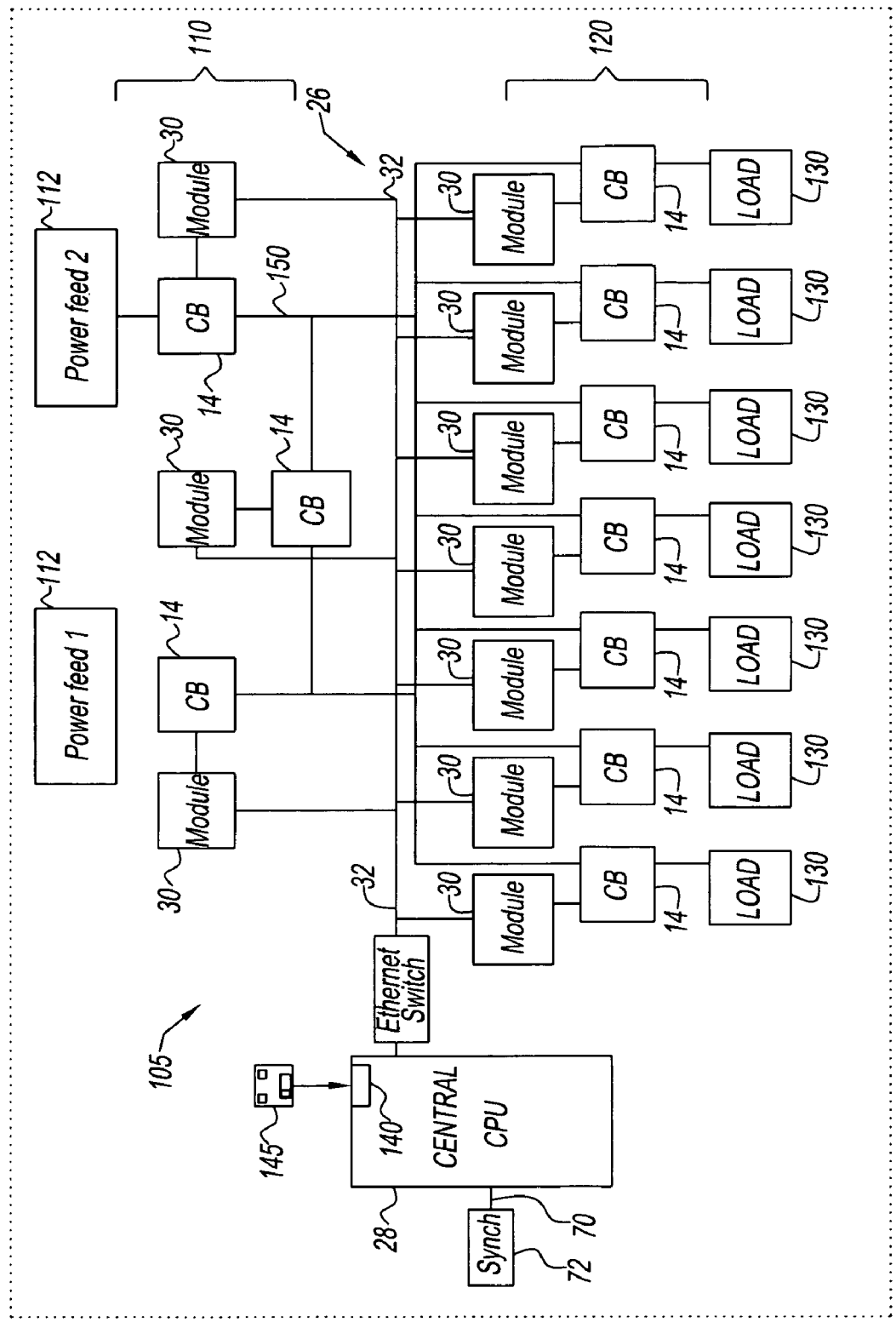
FIG. 4 is a schematic illustration of a multiple source power distribution system.

Referring to FIG. 4, an exemplary embodiment of a multi-source, multi-tier power distribution system generally referred to by reference numeral 105 is illustrated with features similar to the features of FIG. 1 being referred to by the same reference numerals. System 105 functions as described above with respect to the embodiment of FIGS. 1 through 3, and can include the same features but in a multi-source, multi-layer configuration. System 105 distributes power from at least one power feed 112, in this embodiment a first and second power feed, through a power distribution bus 150 to a number or plurality of circuit breakers 14 and to a number or plurality of loads 130. CCPU 28 can include a data transmission device 140, such as, for example, a CD-ROM drive or floppy disk drive, for reading data or instructions from a medium 145, such as, for example, a CD-ROM or floppy disk.

Circuit breakers 14 are arranged in a layered, multi-leveled or multi-tiered configuration with a first level 110 of circuit breakers and a second level 120 of circuit breakers. Of course, any number of levels or configuration of circuit breakers 14 can be used with system 105. The layered configuration of circuit breakers 14 provides for circuit breakers in first level 110 which are upstream of circuit breakers in second level 120. In the event of an abnormal condition of power in system 105, i.e., a fault, protection system 26 seeks to coordinate the system by attempting to clear the fault with the nearest circuit breaker 14 upstream of the fault. Circuit breakers 14 upstream of the nearest circuit breaker to the fault remain closed unless the downstream circuit breaker is unable to clear the fault. Protection system 26 can be implemented for any abnormal condition or parameter of power in system 105, such as, for example, long time, short time or instantaneous overcurrents, or excessive ground currents.

In order to provide the circuit breaker 14 nearest the fault with sufficient time to attempt to clear the fault before the upstream circuit breaker is opened, the upstream circuit breaker is provided with an open command at an adjusted or dynamic delay time. The upstream circuit breaker 14 is provided with an open command at a modified dynamic delay time that elapses before the circuit breaker is opened. In an exemplary embodiment, the modified dynamic delay time for the opening of the upstream circuit breaker 14 is based upon the location of the fault in system 105. Preferably, the modified dynamic delay time for the opening of the upstream circuit breaker 14 is based upon the location of the fault with respect to the circuit breakers and/or other devices and topology of system 105.

CCPU 28 of protection system 26 can provide open commands at modified dynamic delay times for upstream circuit breakers 14 throughout power distribution system 105 depending upon where the fault has been detected in the power flow hierarchy and the modified dynamic delay times for the opening of each of these circuit breakers can preferably be over an infinite range. Protection system 26 reduces the clearing time of faults because CCPU 28 provides open commands at modified dynamic delay times for the upstream circuit breakers 14 which are optimum time periods based upon the location of the fault. It has been found that the clearing time of faults has been reduced by approximately 50% with the use of protection system 26, as compared to the use of contemporary systems.

Figure 5:
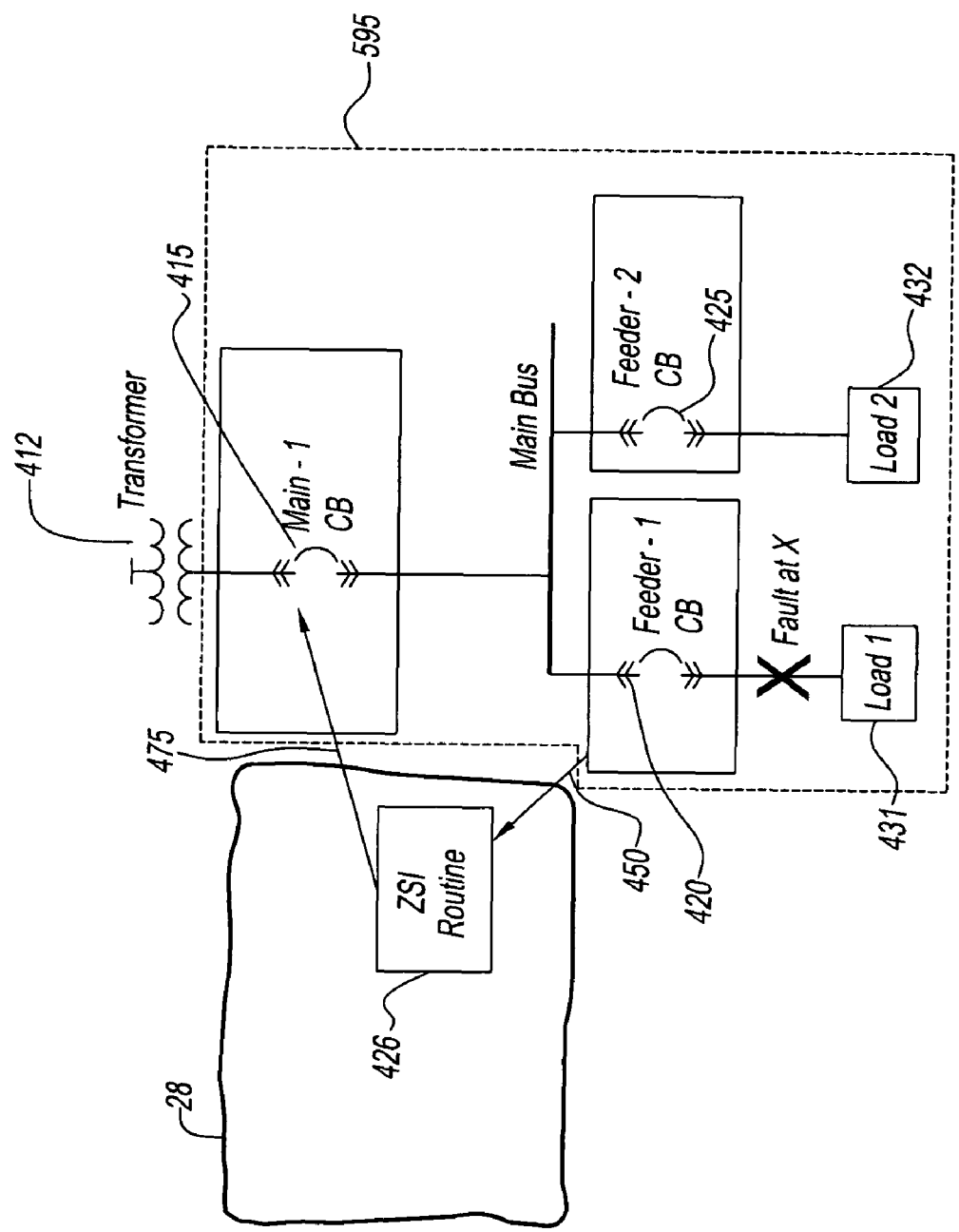
FIG. 5 is a schematic illustration of a portion of the system of FIG. 4 with a fault occurring downstream of Feeder-1 Circuit Breaker.

Referring to FIG. 5, an exemplary embodiment of a zone of protection 595 within power distribution system 105 is shown. Zone 595 has a two-tier circuit with a main-1 circuit breaker (CB) 415 upstream of feeder 1 CB 420 and feeder 2 CB 425, which are in parallel with each other. Power flow is from transformer 412 through main-1 CB 415, feeder 1 CB 420 and feeder 2 CB 425, to loads 431, 432. In the event of a fault X occurring between feeder 1 CB 420 and load 431, the existence of the fault and the location of the fault is determined by CCPU 28 in the manner as described above and as schematically represented by reference numeral 450. The nearest circuit breaker upstream of the fault X, i.e., feeder 1 CB 420, is placed into "pickup mode" by CCPU 28 and waits a pre-defined delay time before being opened. The modified dynamic delay time for the opening of main-1 CB 415 (the next nearest circuit breaker that is upstream of fault X) is then determined by zone selective interlock (ZSI) routine 426. In an exemplary embodiment, ZSI routine 426 is an algorithm, or the like, performed by CCPU 28 based upon the sample data for the power distribution system 10. CCPU 28 determines the dynamic delay times for the opening of any number of upstream circuit breakers 14 and provides open or actuation commands to open the circuit breakers at the dynamic delay times.

In an exemplary embodiment, the modified dynamic delay time for main-1 CB 415 is determined from the sum of the pre-defined delay time and the clearing time of feeder 1 CB 420. The pre-defined delay time is set to best service load 431. The clearing time of a circuit breaker, such as feeder 1 CB 420, is dependent on the type of circuit breaker. The delay time for opening of main-1 CB 415 is then modified based upon the value determined by CCPU 28, as schematically represented by reference numeral 475. This allows feeder 1 CB 420 the optimal time for feeder 1 CB 420 to clear the fault X before main-1 CB 415 opens. The modified dynamic delay time determined by ZSI routine 426 reduces potential damage to system 105. The modified dynamic delay time also increases the efficiency of system 105 by delaying the opening of main-1 CB 415 for the optimal time period to provide the downstream circuit breaker, feeder 1 CB 420, with the full opportunity to clear the fault X so that other loads, i.e., load 432, can still receive power.

Figure 6:
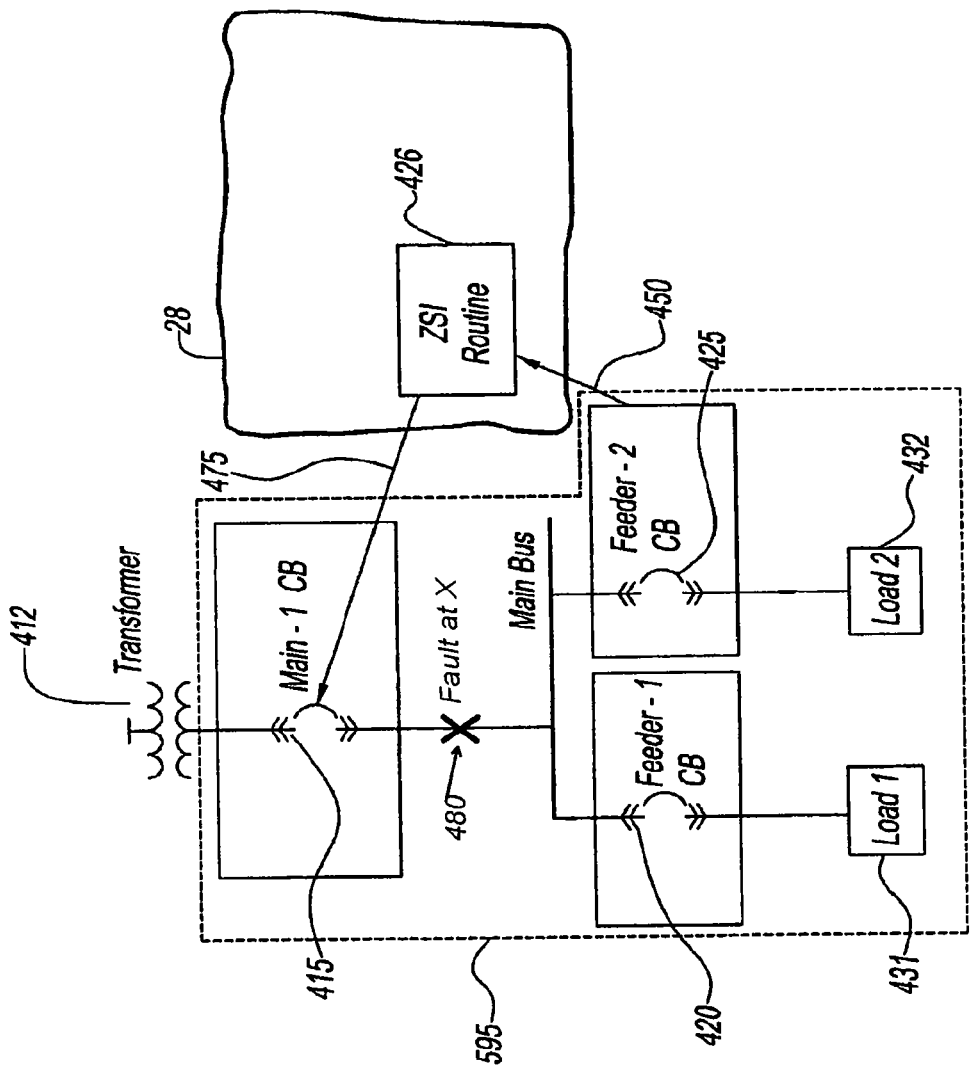
FIG. 6 is a schematic illustration of the portion of the system of FIG. 4 with a fault occurring downstream of Main-1 Circuit Breaker.

Referring to FIG. 6, zone 595 of power distribution system 105 is shown with a fault X occurring between main-1 CB 415 and either feeder 1 CB 420 or feeder 2 CB 425. In the manner described above, the existence and location of fault X is determined, as represented schematically by reference numeral 480. Since only main-1 CB 415 is available to clear fault X, ZSI routine 426 does not modify the dynamic delay time of the opening of main-1 CB and the main-1 CB will open in its pre-defined delay, which is typically much less than the dynamic time delay in the previous two examples.

CCPU 28 coordinates protection system 26 by causing the circuit breaker 14 nearest to the fault to clear the fault. Protection system 26 variably adjusts the dynamic delay time for opening of the upstream circuit breakers 14 to provide backup protection for the downstream circuit breaker nearest the fault. In the event that the downstream circuit breaker 14 nearest the fault is unable to clear the fault, the next upstream circuit breaker will attempt to clear the fault with minimal additional delay based upon its modified dynamic delay time. As shown in FIG. 6, when a fault occurs between a main circuit breaker and a feeder circuit breaker, e.g., main-1 CB 415 and feeder 1 CB 420, the minimal delay of the main-1 CB opening reduces the let-thru energy. This reduces system stress, damage and potential arc energy exposure of operating and service personnel while maintaining selectivity. In an exemplary embodiment, protection system 26 and CCPU 28 allow the implementation of ZSI routine 426 to modify the dynamic delay times for opening of any circuit breakers 14 throughout system 105 without the need for additional wiring coupling each of the circuit breakers to one another. CCPU 28 provides an open command to the upstream circuit breakers 14 for opening at dynamic delay times as determined by ZSI routine 426.

In an exemplary embodiment, ZSI routine 426 is performed at CCPU 28 and interacts with the individual protection functions for each module 30, which are also determined at the CCPU. ZSI routine 426 could also use pre-set clearing times for circuit breakers 14 or the clearing times for the circuit breakers could be determined by CCPU 28 based on the physical hardware, which is known by the CCPU. The CCPU 28 effectively knows the topology of power distribution system 105, which allows the CCPU to open the circuit breakers 14 at an infinite range of times.

Figure 7:
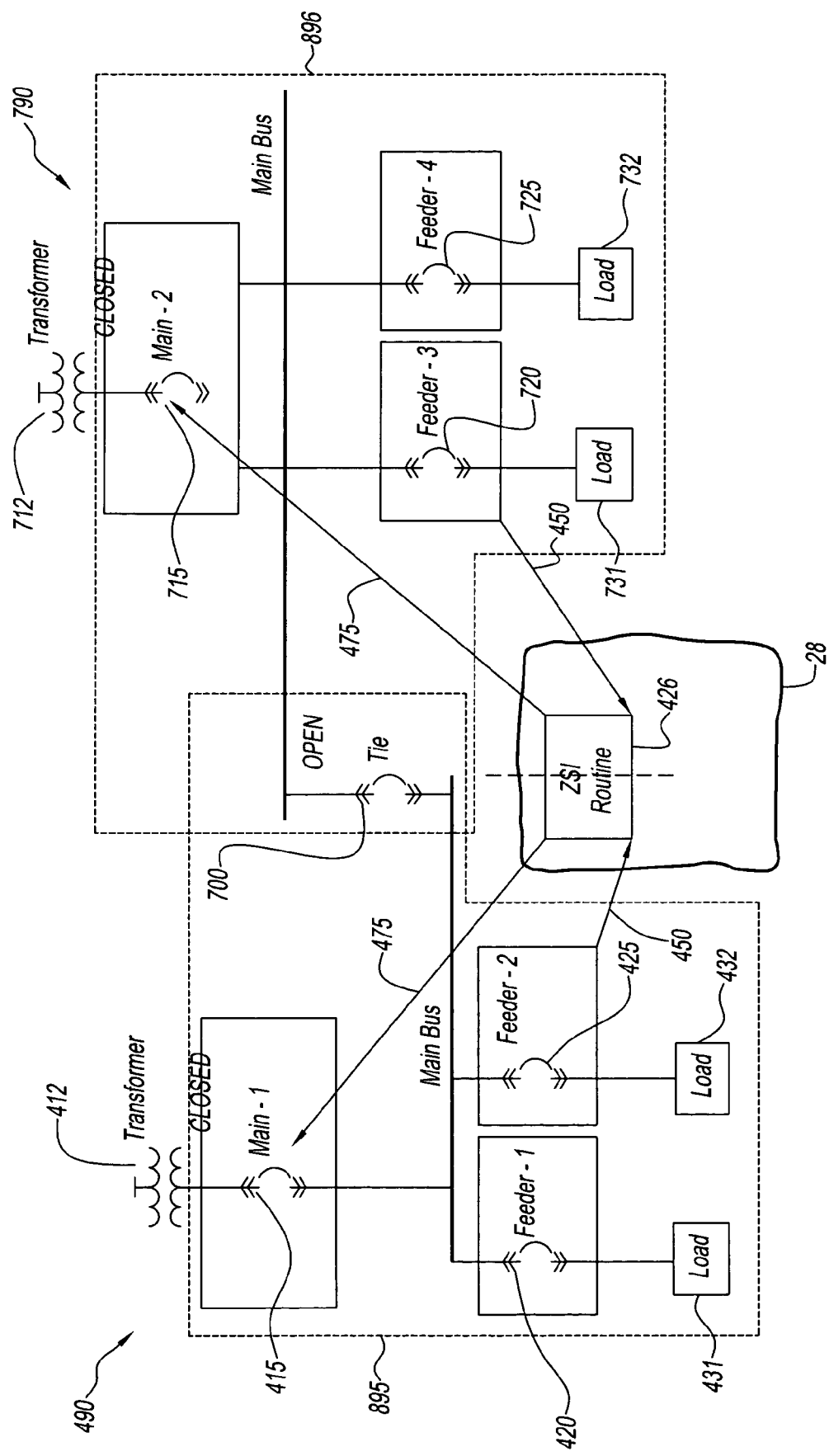
FIG. 7 is a schematic illustration of a portion of the system of FIG. 4 with a Tie Circuit Breaker having an open or tripped status.

Referring to FIG. 7, the portion of power distribution system 105 having a first two-tier circuit branch 490 and a second two-tier circuit branch 790 coupled by a tie CB 700 is shown. In this circuit, CCPU 28 has defined first and second zones of protection 895, 896 in circuit branch 490 and circuit branch 790, respectively. In the event of a fault, protection system 26 implements ZSI routine 426, as described above with respect to the two-tier circuit branch of FIGS. 5 and 6, independently for each of the circuit branches 490, 790.

Figure 8:
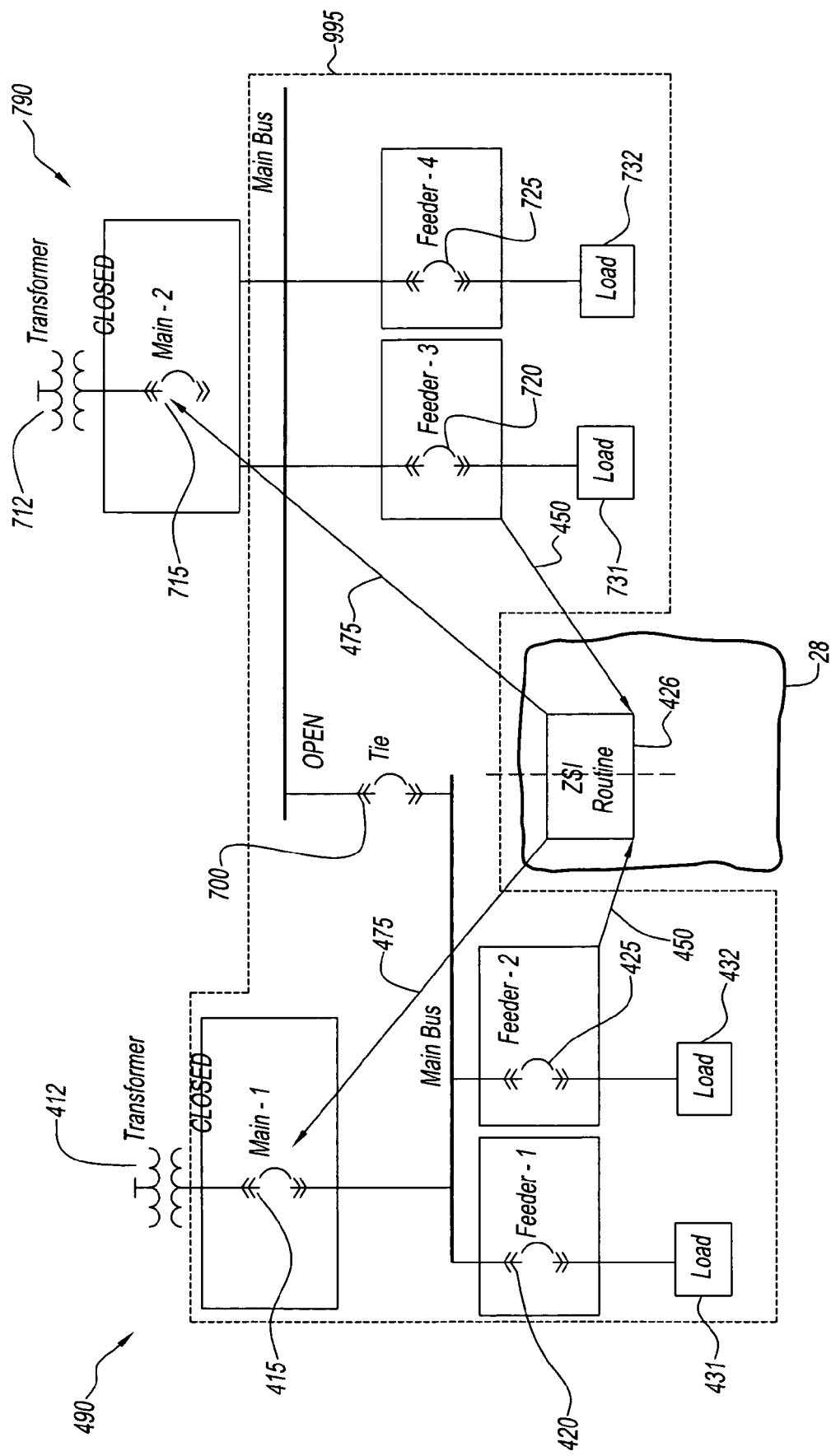
FIG. 8 is a schematic illustration of the portion of the system of FIG. 7 with a Main Circuit Breaker 2 having an open or tripped status.

Referring to FIG. 8, a change in the topology of the power distribution system 105 has occurred with main-2 CB 715 being opened and tie CB 700 being closed. CCPU 28 redefines the zone of protection based upon this change of topology. CCPU 28 creates a new third zone of protection 995. Zone 995 is a three-tiered circuit with feeder 3 CB 720 and feeder 4 CB 725 in the third tier or level of circuit breakers. The status of all of the circuit breakers, including main-2 CB 715 and tie CB 700, is known by CCPU 28, as represented schematically by reference numerals 450. In the event of a fault (not shown) in first circuit branch 490 downstream of the feeder 1 CB 420 or the feeder 2 CB 425, the ZSI routine 426 would modify the dynamic delay time for the opening of main-1 CB 415, as described above with respect to FIG. 5.

In an exemplary embodiment, the protection functions performed at CCPU 28, including ZSI routine 426, are based on state information or status of circuit breakers 14, as well as current. Through the use of protection system 26, the state information is known by CCPU 28. The state information is synchronized with the current and the voltage in power distribution system 105. CCPU 28 effectively knows the topology of the power distribution system 105 and uses the state information to track topology changes in the system. CCPU 28 and ZSI routine 426 utilizes the topology information of power distribution system 105 to optimize service and protection.

Of course, it is contemplated by the present disclosure for power distribution system 105 to have any number of tiers or levels and any configuration of branch circuits. The dynamic delay time for opening of any number of circuit breakers 14 upstream of the fault could be modified as described above based upon the location of the fault in the power flow hierarchy. Additionally, the zones of protection and the dynamic delay times can change as the power distribution system 105 changes. In an alternate embodiment, ZSI routine 426 can modify the dynamic delay time for opening of the upstream circuit breakers 14 based upon other factors using different algorithms. Protection system 26 allows for the dynamic changing of the delay times for opening of circuit breakers 14 throughout the power distribution system 105 based upon any number of factors, including the location of the fault. Protection system 26 also allows for the upstream circuit breaker 14 to enter the pickup mode as a function of the downstream circuit breaker 14 fault current and pickup settings as opposed to its own current and pickup settings.

The embodiments of FIGS. 1 through 8 describe the implementation of ZSI routine 426 at CCPU 28. However, it is contemplated by the present disclosure that the use of dynamic delay times for opening of circuit breakers 14 and/or the use of ZSI routine 426 can be implemented in other ways such as, for example, in a distributed control system with supervision by CCPU 28 or a distributed control system with peer to peer communications. In such distributed control systems, the delay time for opening of the upstream circuit breaker 14 will be modified to a dynamic delay time and/or based at least in part on the location of the fault in the power flow hierarchy. The dynamic delay times for the upstream circuit breakers 14 can also be determined and communicated to the upstream circuit breakers and/or circuit breaker actuators operably connected to the breakers.

System 26 provides synchronized, real time, per sample data via network 32 from multiple points of power distribution system 10 to central control processing unit 28. System 26 can perform zone protection for power distribution system 10 through algorithms applied to the sampled data. If determined necessary, a command can be generated and sent via network 32 to cause operation of circuit protection devices, such as, for example, circuit breaker 14, a switch, or other power flow control devices. System 26 can also provide real time status of the power devices such as, for example, open or closed status, health, and the availability to perform functions. This information is significant in the real time monitoring of the state or topology of the power distribution system 10 and the zones of protection therein. The open or closed status of the power switching devices effectively defines the power flow state or topology of the power distribution system 10.

In an exemplary embodiment, protection system 26, can perform dynamic zone protective functions for the zones of protection of power distribution system 105. The dynamic operation of system 26, and its capability of adjusting the zone protection functions, including, but not limited to, the algorithms and/or the coefficients associated with the algorithms, accounts for changes in the topology within the zone of protection, as well as throughout the entire circuit.

Figure 9:
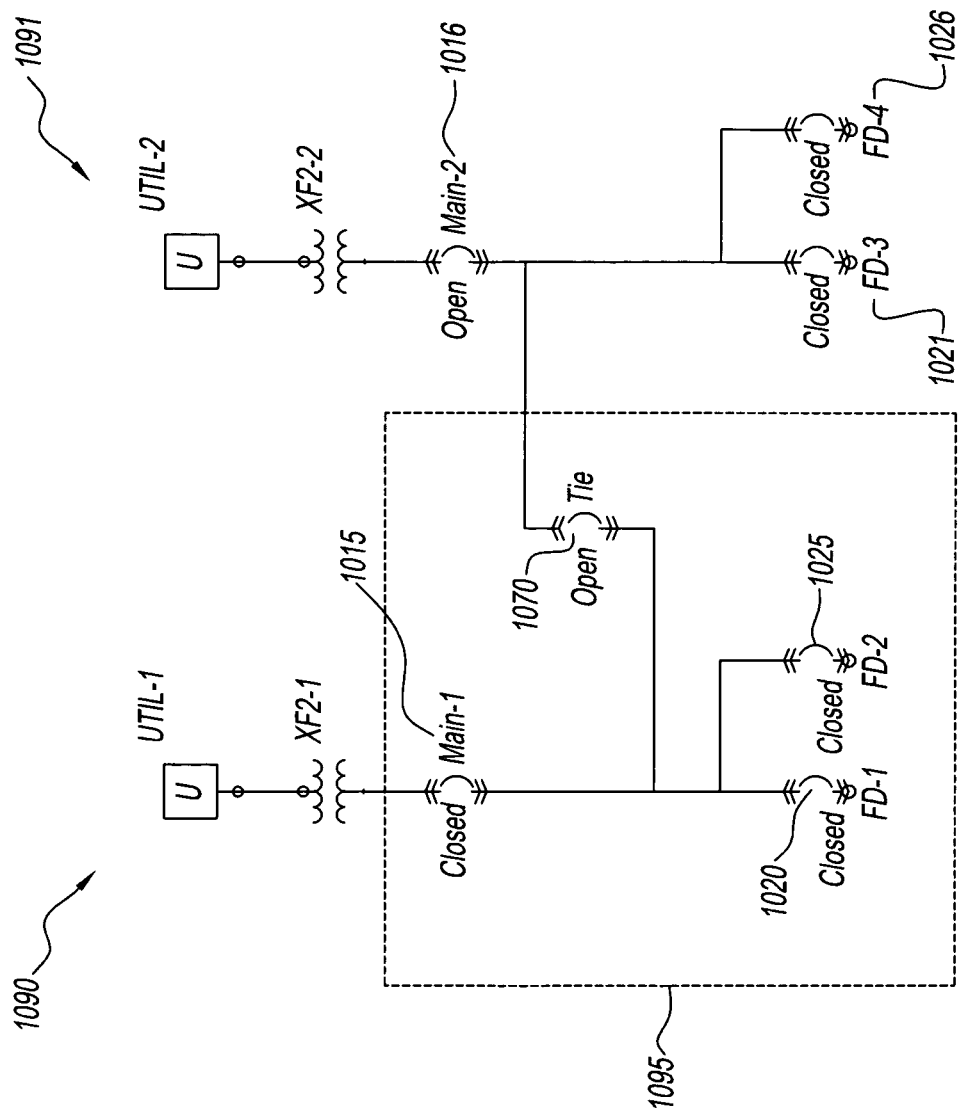
FIG. 9 is a schematic illustration of the portion of the system of FIG. 4 with a first zone of protection.

Referring to FIG. 9, a portion of power distribution system 105 is shown having a first two-tier circuit branch 1090 and a second two-tier circuit branch 1091, which are linked by a tie CB 1070. Tie CB 1070 is in an opened position. A first zone of protection 1095 is defined by CCPU 28 based on the state, topology or configuration of power distribution system 105. The state or topology is the configuration of various power equipment in the power distribution system 105, e.g., power switching devices, such as, for example, circuit breakers 14, which control power flow based upon their status, e.g., opened or closed. Zone 1095 includes main-1 CB 1015, feeder-1 CB 1020, feeder-2 CB 1025, and tie CB 1070. Main-2 CB 1016, feeder-3 CB 1021, and feeder-4 CB 1026 have been defined by CCPU 28 as not being members of the zone 1095 but may be members of another zone (not shown). In the state shown in FIG. 9 within zone 1095, and recognized by CCPU 28 as a result of the sample data, main-1 CB 1015 is a power source, feeder-1 CB 1020 is a power sink, and feeder-2 CB 1025 is a power sink. Tie CB 1070 is neither a power source nor a power sink because it is in an opened position.

Zone protective functions for zone 1095 can be carried out in connection with protection system 26 and CCPU 28, as described above. An example of such a zone protective function is bus differential protection. While the following describes application of bus differential protection, the present disclosure contemplates application of all types of zone protective functions, such as, for example, transformer differential, ground fault or zone selective interlock. The bus protection function described herein is merely an example of the dynamic operation of system 26 and its capability to adapt to changes in the topology within the zone of protection and to adapt to changes in the topology throughout power distribution system 105.

Bus differential protection monitors for a fault by determining if there is a residual current in zone 1095, which fails to pass through the zone. This determination can be made by summation of the power into the zone 1095 from the power sources and the power out of the zone from the power sinks. The existence of the residual current can be indicative of a fault within the zone, such as, for example, a phase to ground fault, a phase to neutral fault or a phase to phase fault, and could warrant interruption of the current through zone 1095 to limit damage within power distribution system 105.

On a per phase basis, the bus differential function is defined by equation one:

$$i_r = \|i_{power\ sources}\| - \|i_{power\ sinks}\|$$

where $i_r$ is the residual current. The CCPU 28 can determine the existence of a fault based upon $i_r$ exceeding a threshold. Applying equation one to zone 1095 of FIG. 9, provides a bus differential function defined by equation two:

$$i_r = i_{main-1} - (i_{feeder-1} + i_{feeder-2})$$

where $i_{main-1}$ is the current at main-1 CB 1015, $i_{feeder-1}$ is the current at feeder-1 CB 1020, and $i_{feeder-2}$ is the current at feeder-2 CB 1025. If $i_r$ meets or exceeds a threshold value, then CCPU 28 can apply circuit breaker algorithms, such as, for example, instantaneous, fixed delay or inverse time, or other protective functions to determine when the circuit breaker should be tripped. and preferably to also cause the trip.

Figure 10:
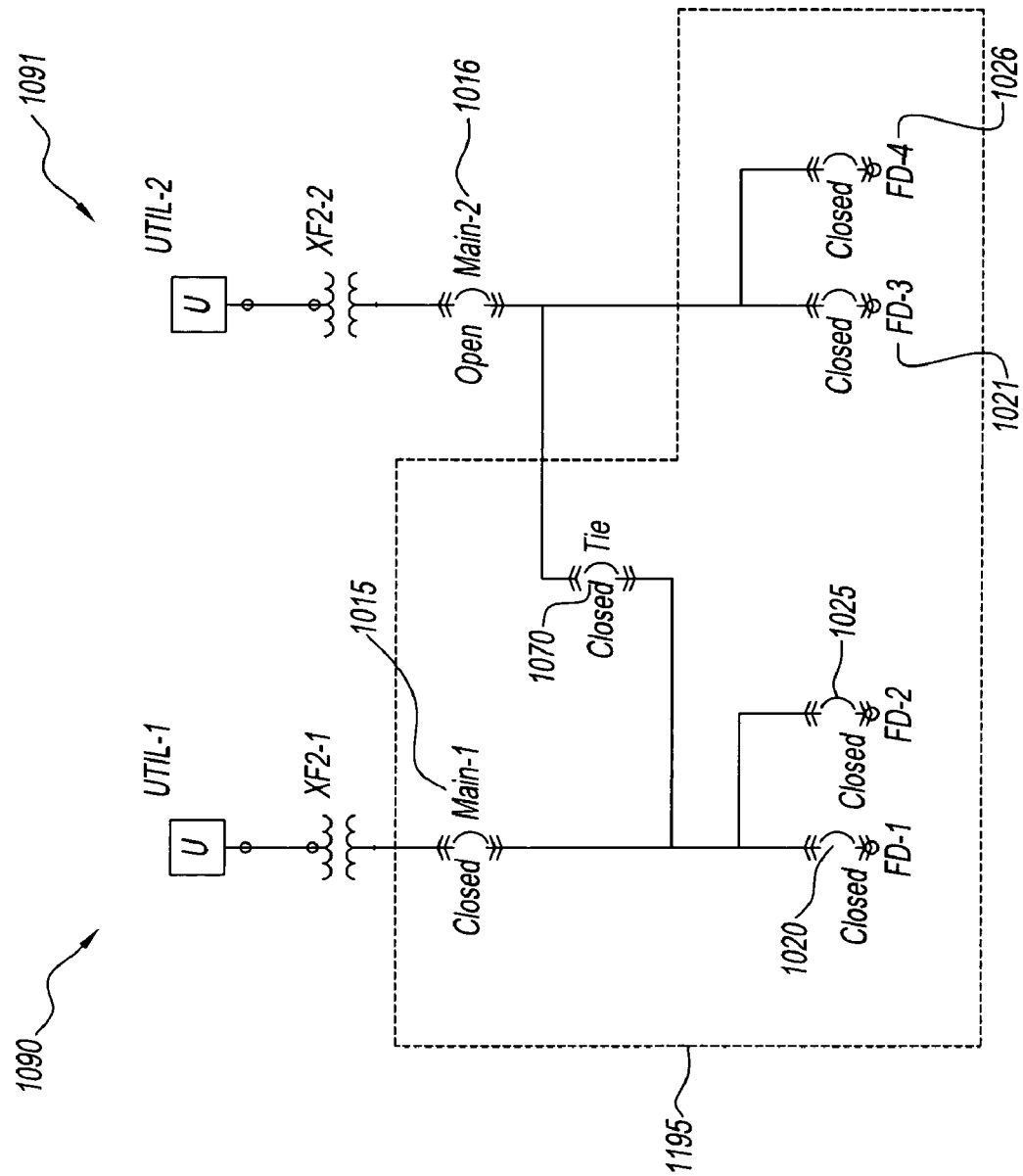
FIG. 10 is a schematic illustration of the portion of the system of FIG. 9 with a second zone of protection.

If the configuration of power distribution system 105 were changed by closing tie CB 1070 (as shown in FIG. 10), then the tie CB would be a power sink of zone 1095. Again applying equation one to zone 1095 where tie CB 1070 is now closed, provides a bus differential function defined by equation three:

$$i_r = i_{main-1} - (i_{feeder-1} + i_{feeder-2} + i_{tie})$$

where $i_{main-1}$ is the current at main-1 CB 1015, $i_{feeder-1}$ is the current at feeder-1 CB 1020, $i_{feeder-2}$ is the current at feeder-2 CB 1025 and $i_{tie}$ is the current at tie CB 1070. CCPU 28 has all of the information for the device status available to it at the same time as all of the information for the current. Based upon the state or topology of power distribution system 105, and, in particular, the state or topology within zone 1095 with tie CB 1070 now closed, CCPU can apply equation three for determining the residual current within the zone. The ability for CCPU 28 to have the state information at the same time as the current, allows CCPU 28 to apply the correct algorithm for the bus differential protection function, and avoids application of the erroneous equation two causing a false trip within zone 1095. The protection function can continue effectively uninterrupted to provide the same protection to the new state, topology or configuration within zone 1095.

Referring to FIGS. 9 and 10, zone 1095 would provide protection for first circuit 1090 but would fail to protect second circuit 1091, and, in particular, feeder-3 CB 1021 and feeder-4 CB 1026, which are supplied power from the first circuit through tie CB that has now been closed. As shown in FIG. 10, CCPU 28 can redefine the zone of protection for this portion of the circuit as zone 1195. Zone 1195 further includes feeder-3 CB 1021 and feeder-4 CB 1026, which are in parallel with feeder-1 CB 1020 and feeder-2 CB 1025. Applying equation one to zone 1195, provides a bus differential function defined by equation four:

$$i_r = i_{main-1} - (i_{feeder-1} + i_{feeder-2} + i_{feeder-3} + i_{feeder-4})$$

where $i_{main-1}$ is the current at main-1 CB 1015, $i_{feeder-1}$ is the current at feeder-1 CB 1020, $i_{feed-2}$ is the current at feeder-2 CB 1025, feeder-3 is the current at feeder-3 CB 1021, and $i_{feeder-4}$ is the current at feeder-4 CB 1026. With the device status information available and the current available, CCPU 28 can apply the bus differential protection function for zone 1195 as defined by equation four. In addition to the change in the algorithm that is applied to protect zone 1195, there are now more members of the zone, which introduce additional errors due to the summation in this particular algorithm. CCPU 28 can also change the pickup points and change the tolerances to compensate for these additional errors.

Figure 11:
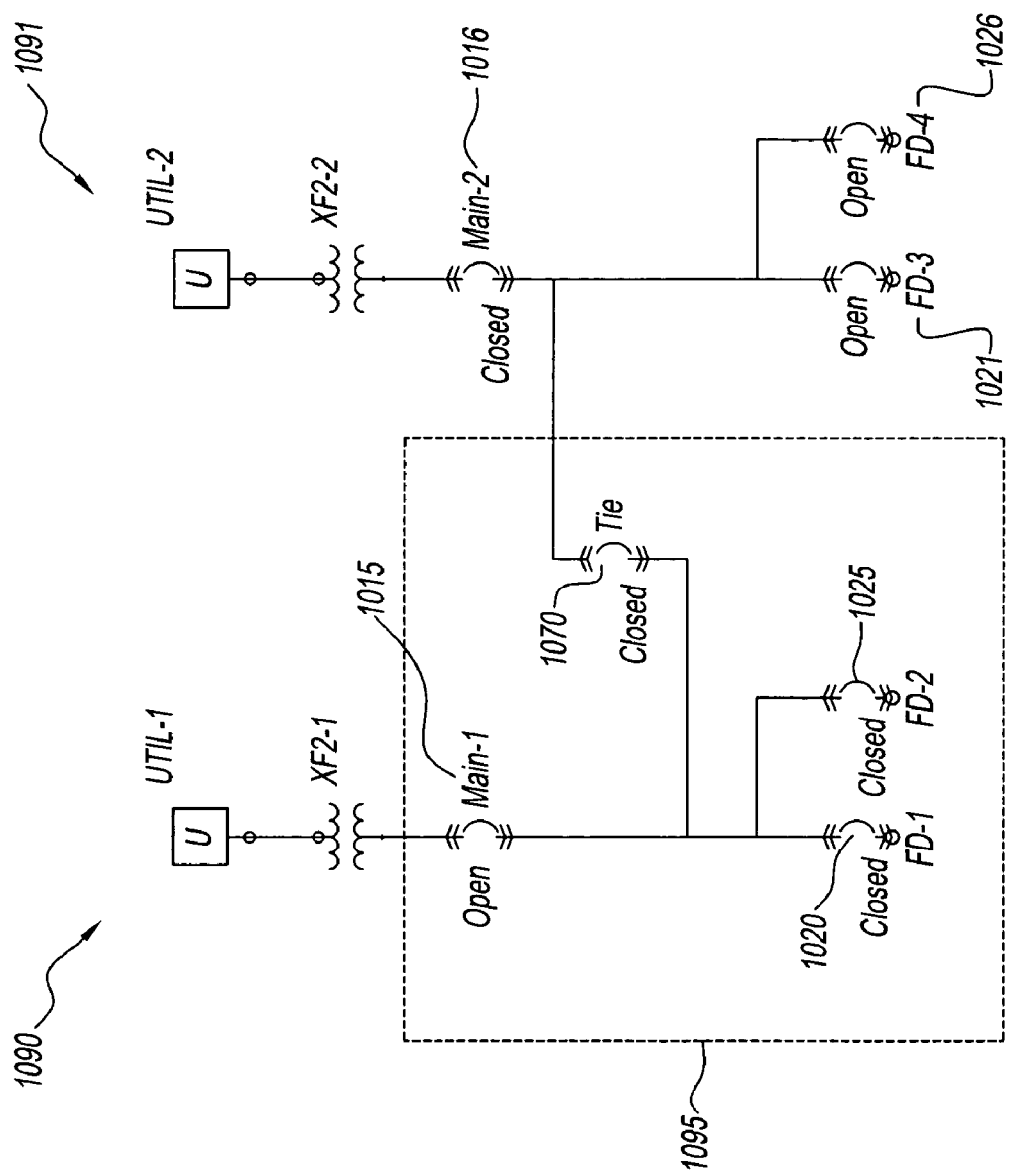
FIG. 11 is a schematic illustration of the portion of the system of FIG. 9 with the first zone of protection and a different topology.

Referring to FIG. 11, a further change in the configuration of power distribution system 105 where main-1 CB 1015, feeder-3 CB 1021 and feeder-4 CB 1026 are opened, and where main-2 CB 1016 is closed, results in a change in the direction of power flow. CCPU 28 recognizes the change in state or topology of this portion of power distribution system 105, including the direction of power flow, and can again redefine a zone of protection as zone 1095 with tie CB 1070 being the power source for the zone. Applying equation one to zone 1095, provides a bus differential function defined by equation five:

$$i_r = (i_{main-1} + i_{tie}) - (i_{feeder-1} + i_{feeder-2})$$

where $i_{main-1}$ is the current at main-1 CB 1015 (zero in this case), $i_{tie}$ is the current at tie CB 1070, $i_{feeder-1}$ is the current at feeder-1 CB 1020, and $i_{feed-2}$ is the current at feeder-2 CB 1025. With the device status information available and the current available, CCPU 28 can apply the bus differential protection function for zone 1095 as correctly defined by equation five rather than equation four which is inapplicable due to the change in the topology.

Protection system 26 provides dynamic zone protection for power distribution system 105 based upon the changing state, topology or configuration of the power distribution system. The protection system can adjust the zones of protection throughout the power distribution system 105 based upon changes or adjustments to the configuration of the power distribution system, or based upon other factors, such as, for example, priority of protection. The synchronized, per sample data protection of protection system 26, including CCPU 28, allows for performance of sample by sample calculations. The synchronization of the data is significant because the difference of the currents is a vector quantity. If the data were not synchronized, the phase shift of the data could result in erroneous residual currents. Also, the use of sample by sample calculations provides the true root-mean-square values of the residual current including harmonics preferably up to half of the sampling frequency.

The dynamic operation of protection system 26 also allows for monitoring of the health or status of the data collection devices, such as modules 30. The data for the health or status of the devices is preferably synchronized with data for the topology and other electrical parameters, such as, for example, the current. Algorithms, including internal self-health algorithms, in conjunction with the other electrical parameters, such as current, voltage and/or device status, can be used to provide for alteration or suspension of the particular protection functions in the event of a data collection error. For example, protection system 26 can recognize A/D conversion failing to function because the data ready interrupt of the A/D converter 62 is never received. This error condition would be reported to CCPU 28. If the missing data were not considered in the protection function, then the calculated residual current could be erroneously high resulting in an unwarranted or nuisance trip within the power distribution system 105 based upon the lack of data.

The dynamic zone protection provided by protection system 26 is based in part upon current and/or voltage calculations from multiple circuit points that are power sources or power sinks, and connected in parallel or in series. The state or topology of the system is recognized and effectively evaluated at the same speed as the current and/or voltage calculations. Protection system 26 can recognize and redefine the circuit points as power sources or power sinks, and whether in series or in parallel. Based upon the state of the power distribution system 105, entirely different zone protective functions may be defined and applied. The protection system 26 can define a plurality of zones of protection throughout the power distribution system 105, and can dynamically adjust the zones as the state or topology of the power distribution system changes.

While the instant disclosure has been described with reference to one or more exemplary embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this invention, but that the invention will include all embodiments falling within the scope of the appended claims.

What is claimed is:

1. A power distribution system comprising:
   a circuit having a zone of protection, said circuit comprising a first circuit breaker and a second circuit breaker, said first circuit breaker being downstream of said second circuit breaker, said first circuit breaker having a first current running therethrough and first pickup settings and said second circuit breaker having a second current running therethrough and second pickup settings; and
   a control processing unit being communicatively coupled to said first and second circuit breakers, wherein said control processing unit monitors a topology of said zone of protection, wherein said control processing unit adjusts a zone protective function for said zone of protection based at least in part upon said topology, and wherein said control processing unit performs said zone protective function to detect a fault in said zone of protection, wherein said control processing unit operatively controls said first and second circuit breakers including instantaneous overcurrent protection, and wherein said control processing unit causes said second circuit breaker to enter a pickup mode as a function of said first current and said first pickup settings when said fault is detected downstream of said first circuit breaker.

2. The system of claim 1, further comprising a network communicatively coupled to said control processing unit and said circuit.

3. The system of claim 1, wherein said control processing unit receives parameter signals representative of electrical parameters of said circuit, and wherein said control processing unit opens said first and/or second circuit breaker in response to said parameter signals if said fault is detected.

4. The system of claim 3, wherein said control processing unit applies an algorithm to said electrical parameters to perform said zone protective function on said zone of protection.

5. The system of claim 4, wherein said control processing unit uses a coefficient of said algorithm in applying said zone protective function, and wherein said control processing unit adjusts said coefficient based at least in part upon changes to said topology.

6. The system of claim 3, wherein said electrical parameters further comprise a state of said first and second circuit breakers, said state being either opened or closed, and wherein said topology is determined by said control processing unit based at least in part upon said state.

7. The system of claim 3, further comprising a first circuit breaker actuator in communication with said control processing unit, wherein said circuit breaker actuator receives an actuation signal from said control processing unit, said actuation signal causing said first circuit breaker actuator to open said first circuit breaker.

8. The system of claim 7, wherein said control processing unit determines a dynamic delay time for opening said first circuit breaker, and wherein said actuation signal causes said first circuit breaker actuator to open said first circuit breaker after said dynamic delay time has elapsed.

9. The system of claim 3, further comprising a module and a sensor, said module being in communication with said first circuit breaker, said sensor and said control processing unit, wherein said sensor senses said electrical parameters and communicates said parameter signals to said module, and wherein said module communicates said parameter signals to said control processing unit.

10. The system of claim 9, wherein said control processing unit monitors said sensor for an error in sensing said electrical parameters, and wherein said control processing unit adjusts said zone protective function based at least in part upon said error.

11. The system of claim 9, wherein said control processing unit monitors said module for an error in communicating said parameter signals, and wherein said control processing unit adjusts said zone protective function based at least in part upon said error.

12. A power distribution system comprising:
a circuit having a plurality of circuit breakers,
a plurality of data modules, each data module of said plurality of data modules being in communication with a different circuit breaker of said plurality of circuit breakers;
a central control processing unit;
a data network communicating between said central control processing unit and each of said plurality of data modules,
said plurality of modules providing digital signals to said central control processing unit over said data network based, at least in part on a synchronization instruction from said central control processing unit received over said data network, so that said digital signals are representative of a current and a breaker state at each of said plurality of circuit breakers within a predetermined time-window such that said central control processing performs at least an instantaneous overcurrent protection function for said plurality of circuit breakers, and
said central control processing unit determining a topology of said circuit upon receipt of said breaker state, defining a zone of protection for at least a portion of said plurality of circuit breakers based upon said topology, and applying a different zone protection algorithm to said zone of protection based on said topology and said current.

13. The system of claim 12, wherein said predetermined time-window is less than about ten microseconds.

14. The system of claim 12, wherein said predetermined time-window is less than about five microseconds.

15. The system of claim 12, wherein said plurality of circuit breakers are arranged in a configuration selected from the group consisting of series, parallel, and combinations thereof.

16. The system of claim 12, wherein said central control processing unit determines a dynamic delay time for opening at least one of said plurality of breakers if a fault is detected in said circuit, said dynamic delay time being based at least in part on a location of said fault.

17. The system of claim 16, wherein said central control processing unit delays opening said at least one circuit breaker until after said dynamic delay time has elapsed, said dynamic delay time being selectively generated by said central control processing unit in response to said digital signals if said fault is detected in said circuit, wherein said central control processing unit determines a nearest breaker upstream to said fault and wherein said dynamic delay time is based at least in part on a clearing time of said nearest breaker.

* * * * *